Patented Aug. 22, 1944

2,356,228

UNITED STATES PATENT OFFICE 2,356,228

PROCESS FOR THE PRODUCTION OF CELLULOSE ESTERS

Henry Dreyfus, London, England, assignor to Celanese Corporation of America, a corporation of Delaware No Drawing. Application November 22, 1940, Serial No. 366,701. In Great Britain September 17, 1940

8 Claims. (Cl. 260—227)

This invention is concerned with improvements in the manufacture of organic compounds and particularly in the manufacture of cellulose acetate and other organic derivatives of cellulose.

The usual method for the production of cellulose acetate and other organic esters of cellulose consists in esterifying cellulose with the appropriate organic acid anhydride using sulphuric acid as the catalyst in the presence of acetic acid or other lower fatty acid which is a solvent for the cellulose ester produced. Esterification is continued until the product contains approximately three ester radicles per $C_6H_{10}O_5$ unit and this product, which is known as the "primary ester," is then hydrolysed or "ripened" by adding somewhat more water than is necessary to destroy the residual acid anhydride and maintaining the solution at approximately atmospheric temperature until a cellulose ester, known as the "secondary ester," having the required properties is obtained.

The present invention is concerned with an improved method for the production of cellulose acetate and other organic esters of cellulose, wherein esterification is effected in the presence of a neutral hydrophobe organic liquid which, with the other constituents of the esterification mixture, is a solvent for the primary ester and preferably also a solvent for the ripened cellulose ester. The invention is particularly concerned with a process in which esterification is effected in the presence of ethylidene chloride. Other liquids which may be employed are propylene chloride, 1,3 dichlorpropane and similar organic liquids containing at least two chlorine atoms and a carbon atom not attached to chlorine, and butyl and amyl chlorides. The esterification medium may also contain acetic acid or other organic acid.

In carrying out the process of the present invention, cellulose, for example cotton linters or wood pulp, which may have been pretreated in order to render it more easily esterifiable, for example by treatment with formic acid or acetic acid containing a low proportion of sulphuric acid, may be introduced into a medium comprising acetic anhydride or other organic acid anhydride, sulphuric acid and ethylidene chloride. The amount of anhydride may for example, be from 250 to 350% of the weight of the cellulose and the amount of ethylidene chloride may range from 100, 200 or 400% up to 800 or 1,000% or even more, the high proportions being particularly desirable if a cellulose ester of high viscosity is required. The medium may also contain acetic acid or other lower fatty acid. An important advantage of the present process is that quite low proportions of sulphuric acid, e. g., ½, 1, 2 or 5% of the weight of the cellulose, give good results, though higher proportions, e. g., 10 or 15%, may be employed if required, e. g. to increase the rate of esterification.

Esterification is preferably effected at a fairly low temperature, for example 20–30° C., though higher temperatures, e. g., 35 or 40° C., may be employed if it is desired to accelerate the process and if some reduction in the viscosity of the cellulose ester produced is not important. The reaction is continued until the medium is substantially free from fibres and the ester produced is substantially a tri-ester. The primary ester may then be ripened by the addition of water or other hydrolysing agent, e. g., alcohol, and the ripened cellulose ester obtained precipitated, for example by incorporating with the esterification solution water, benzene or other non-solvent for the cellulose ester which is miscible with the liquid constituents of the solution. Alternatively the primary ester may be precipitated and then redissolved for ripening.

Prior to precipitation of the ester part of the solvent medium present may be removed, for example by fractional distillation. Thus if ethylidene chloride or other neutral organic liquid is employed which has a lower boiling point than the organic acid present the esterification solution may be heated to a suitable temperature, if necessary under reduced pressure, in order to separate the neutral organic liquid or a portion of it from the esterification medium. Again, when the neutral organic liquid employed is insoluble in water or other liquid employed for precipitation a considerable proportion of it may be flashed off by effecting precipitation with a precipitating liquid at a temperature approaching or exceeding the boiling point of the neutral organic liquid.

The cellulose acetate or other organic ester of cellulose produced by the process of the present invention may be employed for the production of artificial filaments, foils and other articles by dry or wet spinning operations, or for the production of moulded products.

The following example is given to illustrate the invention:

Example 100 parts of cotton linters, which have been pretreated with 100 parts of acetic acid containing two parts of sulphuric acid for 24 hours at atmospheric temperature, are introduced together with the pretreatment medium into an esterification medium consisting of 300 parts of acetic anhydride and 500 parts of ethylidene chloride. The esterification mixture is maintained at a temperature of 25–30° C. until a solution free from fibres is obtained. Sufficient water, preferably in the form of dilute acetic acid, to destroy residual acetic anhydride and provide an excess of about 30 parts of water is then introduced while the mixture is well stirred and the cellulose acetate is ripened by maintaining it at approximately atmospheric temperature until a secondary cellulose acetate having the desired properties is produced. The cellulose acetate is then precipitated by means of water, washed and dried.

Having described my invention, what I desire to secure by Letters Patent is:

1. Process for the production of lower aliphatic acid esters of cellulose, which comprises esterifying cellulose with a lower aliphatic acid anhydride in a medium which is a solvent for the primary ester formed and contains a neutral hydrophobe organic liquid which is a chlorinated lower aliphatic compound containing at least two chlorine atoms and a carbon atom not attached to chlorine.

2. Process according to claim 1, wherein the neutral hydrophobe organic liquid is ethylidene chloride.

3. Process according to claim 1, wherein esterification is effected with the aid of sulphuric acid as a catalyst in an amount up to 5% of the weight of the cellulose.

4. Process for the production of cellulose acetate, which comprises acetylating cellulose by means of acetic anhydride in a medium which consists largely of ethylidene chloride.

5. Process for the production of cellulose acetate, which comprises acetylating cellulose by means of acetic anhydride in a medium which consists largely of ethylidene chloride, and catalyzing the reaction by means of sulphuric acid present in an amount up to 5% on the weight of the cellulose.

6. Process for the production of cellulose acetate, which comprises acetylating cellulose by means of acetic anhydride in a medium which consists largely of ethylidene chloride, and catalyzing the reaction by means of sulphuric acid present in an amount up to 2% on the weight of the cellulose.

7. Process for the production of cellulose acetate, which comprises pretreating cellulose with a lower fatty acid and thereafter acetylating the cellulose by means of acetic anhydride in a medium which consists largely of ethylidene chloride and which contains sulphuric acid in an amount up to 5% on the weight of the cellulose.

8. Process for the production of cellulose acetate, which comprises pretreating cellulose with a lower fatty acid and thereafter acetylating the cellulose by means of acetic anhydride in a medium which consists largely of ethylidene chloride and which contains sulphuric acid in an amount up to 2% on the weight of the cellulose.

HENRY DREYFUS.